United States Patent
Androsch et al.

(10) Patent No.: US 9,566,745 B2
(45) Date of Patent: Feb. 14, 2017

(54) METHOD FOR PRODUCING A SEMI-FINISHED PRODUCT OR COMPONENT COMPRISING A METAL CARRIER AND A HARDENABLE COATING WITH FIBER-REINFORCED PLASTIC

(71) Applicant: Voestalpine Stahl GmbH, Linz (AT)

(72) Inventors: Franz Androsch, Oberneukirchen (AT); Carola Eyssell, Linz (AT); Bernhard Strauss, Leonding (AT); Christian Walch, Leonding (AT)

(73) Assignee: Voestalpine Stahl GmbH, Linz (AT)

( * ) Notice: Subject to any disclaimer, the term of this patent is extended or adjusted under 35 U.S.C. 154(b) by 0 days.

(21) Appl. No.: 14/391,813

(22) PCT Filed: Apr. 15, 2013

(86) PCT No.: PCT/EP2013/057816
§ 371 (c)(1),
(2) Date: Nov. 11, 2014

(87) PCT Pub. No.: WO2013/153229
PCT Pub. Date: Oct. 17, 2013

(65) Prior Publication Data
US 2015/0298399 A1      Oct. 22, 2015

(30) Foreign Application Priority Data
Apr. 13, 2012   (EP) .................................. 12164199

(51) Int. Cl.
  *B29C 70/08*      (2006.01)
  *B21D 22/02*      (2006.01)
  (Continued)

(52) U.S. Cl.
  CPC ................. *B29C 70/08* (2013.01); *B05D 3/12* (2013.01); *B05D 7/14* (2013.01); *B21D 22/022* (2013.01);
  (Continued)

(58) Field of Classification Search
  CPC ... B21D 22/201; B21D 22/022; B29C 70/088; B29C 70/46; B29C 70/08; B29C 70/085; B05D 7/14; B05D 3/12
  See application file for complete search history.

(56) References Cited

U.S. PATENT DOCUMENTS

| | | |
|---|---|---|
| 4,390,489 A | 6/1983 | Segal |
| 4,545,105 A | 10/1985 | Kowalsky |

(Continued)

FOREIGN PATENT DOCUMENTS

| | | |
|---|---|---|
| DE | 199 56 394 B4 | 2/2005 |
| DE | 10 2008 039 869 A1 | 3/2010 |

(Continued)

OTHER PUBLICATIONS

International Search Report of PCT/EP2013/057816, mailed Aug. 12, 2013.

(Continued)

*Primary Examiner* — Teresa M Ekiert
(74) *Attorney, Agent, or Firm* — Collard & Roe, P.C.

(57) ABSTRACT

The invention relates to a method for producing a semi-finished product or component (2), in which a hardenable coating (6, 17) with fiber-reinforced plastic is applied to a metal carrier (3), particularly a metal sheet (4), and the coated metal carrier (3) is formed, particularly deep-drawn or bent, in a subsequent step to produce a semi-finished product or component (2). According to the invention, for an improved and cost-effective method, the metal carrier (3) is coated at most only in certain regions and is only subjected (Continued)

to the forming when the coating thereof (6, 17) has hardened to produce at least a block-resistant surface (12), the coated metal carrier (3) being formed such that the plastic changes in shape follow forming radii (21) and are produced substantially, preferably exclusively, in the coating-free regions (15) of the metal carrier.

20 Claims, 3 Drawing Sheets

(51) Int. Cl.
| | |
|---|---|
| *B05D 7/14* | (2006.01) |
| *B21D 35/00* | (2006.01) |
| *B62D 29/00* | (2006.01) |
| *B29C 70/46* | (2006.01) |
| *B32B 15/14* | (2006.01) |
| *B05D 3/12* | (2006.01) |
| *B29L 31/30* | (2006.01) |
| *B29C 65/00* | (2006.01) |

(52) U.S. Cl.
CPC .......... *B21D 35/006* (2013.01); *B29C 70/088* (2013.01); *B29C 70/46* (2013.01); *B32B 15/14* (2013.01); *B62D 29/001* (2013.01); *B62D 29/004* (2013.01); *B29C 66/472* (2013.01); *B29C 66/721* (2013.01); *B29C 66/7212* (2013.01); *B29C 66/73751* (2013.01); *B29C 66/73753* (2013.01); *B29C 66/742* (2013.01); *B29C 66/74283* (2013.01); *B29L 2031/3002* (2013.01); *B29L 2031/3055* (2013.01)

(56) References Cited

U.S. PATENT DOCUMENTS

| | | |
|---|---|---|
| 6,460,240 B1 | 10/2002 | Kielies et al. |
| 2004/0221953 A1 | 11/2004 | Czaplicki et al. |
| 2010/0051183 A1 | 3/2010 | Boeke et al. |

FOREIGN PATENT DOCUMENTS

| | | |
|---|---|---|
| DE | 10 2009 009 112 A1 | 11/2010 |
| EP | 1 557 342 A2 | 7/2005 |

OTHER PUBLICATIONS

International Preliminary Report on Patentability of PCT/EP2013/057816 mailed on Oct. 23, 2014.

METHOD FOR PRODUCING A SEMI-FINISHED PRODUCT OR COMPONENT COMPRISING A METAL CARRIER AND A HARDENABLE COATING WITH FIBER-REINFORCED PLASTIC

CROSS REFERENCE TO RELATED APPLICATIONS

This application is the National Stage of PCT/EP2013/057816 filed on Apr. 15, 2013, which claims priority under 35 U.S.C. §119 of European Application No. 12164199.7 filed on Apr. 13, 2012, the disclosures of which are incorporated by reference. The international application under PCT article 21(2) was not published in English.

TECHNICAL FIELD

The invention relates to a method for the production of a semi-finished product or component, in which a hardenable coating with fiber-reinforced plastic is applied to a metal support, particularly a sheet metal, and the coated metal support is formed, particularly deep-drawn or bent, in a further step, to produce a semi-finished product or component.

STATE OF THE ART

Hybrid materials, having multiple metal layers that lie one on top of the other, each coated with unidirectional prepreg plies fiber-reinforced over their full area, are known from the state of the art (DE19956394B4), which are hardened to produce a profile after forming of the hybrid material. Such a method, however, is disadvantageously comparatively sensitive to premature hardening of the prepreg layer, before the hybrid material has assumed its final shape as the result of its forming. This can particularly result in reduced shape precision of the formed hybrid material, along with damage to the fiber-reinforced plastic (FRP) or pre-impregnated carbon fibers (CFP prepreg). A reproducible method therefore cannot be ensured in this manner. Furthermore, carrying out a method with the use of non-hardened prepreg layers is comparatively complicated. Also, such hybrid materials require a comparatively great amount of material in terms of fiber-reinforced plastic. Cost-advantageous semi-finished products or components cannot be produced by means of this method.

Furthermore, it is known, for the production of a fiber-reinforced semi-finished product or component, to first form a steel sheet and, in a further step, to partially provide it with a hardened FRP part or to coat it with the latter. The method steps, which are separated from one another, namely shaping of the metal support and shaping of the FRP part, together with their final connection, for example using bolts (DE102009009112A1) are comparatively complicated in their implementation, and furthermore require expensive semi-finished products or components, particularly since this method requires a comparatively great level of automation effort.

PRESENTATION OF THE INVENTION

It is therefore the task of the invention, proceeding from the state of the art as described initially, to not only simplify the production method for a reinforced semi-finished product or component, but also to make it robust, in order to thereby also achieve great reproducibility of the method. Furthermore, the method is supposed to be accessible to a method sequence that is easy to automate.

The invention accomplishes the stated task in that the metal support is coated at most in certain regions, and is only subjected to forming once its coating has hardened to form at least a block-resistant surface, whereby the coated metal support is formed in such a manner that its plastic changes in shape, which follow forming radii, form essentially, preferably exclusively, in its coating-free regions.

If the metal support is subjected to forming only once its coating has hardened to form at least a block-resistant surface, the method can be configured to be more robust with regard to unavoidable hardening reactions of the FRP coating, because even hardening reactions of the coating are permitted in the method.

In contrast to the state of the art, according to the invention storage times of the metal support also do not have to be observed as strictly, in order to thereby have to accept losses in properties of the polymer matrix resulting from exceeding the processing time period. As a result, relaxation in the method sequence can also occur, particularly because the method steps of coating and forming can take place with greater independence, in terms of time, which can be particularly advantageous for deep-drawing or bending of the metal support in order to shape it. Specifically, the block-resistant state of the surface of the coating can also ensure clean separation of coated metal support and tool even after forming, thereby making great reproducibility and comparatively easy automation of the method possible. In particular, the method according to the invention can also be characterized in that the metal support is coated at most in certain regions, with regard to at least one of its support sides, in order to thereby essentially maintain the plastic formability of the metal support. Comparatively great degrees of forming can furthermore be followed if the metal support is formed in such a manner that its plastic changes in shape, which follow forming radii, form essentially in its coating-free regions. These coating-free support regions can specifically follow plastic deformations unimpaired by the FRP coating, to a great extent. This is all the more true, if the plastic changes in shape form exclusively in these coating-free regions. Even demanding contours, for example those of a rocker panel or side member of a motor vehicle, can thereby be introduced into the metal support with a precise shape. Furthermore, the FRP coating itself, which is block-resistant but not yet completely hardened or at most partially hardened, can permit a certain inherent plastic formability and thereby make a positive contribution to the forming behavior of the metal support, thereby making it possible to follow even tight radii without failure. At the same time, the coated support regions can be characterized by particularly great strength values, and can mechanically stabilize the metal support during forming and also after forming. According to the invention, a high level of capacity for plastic changes in shape can thereby be combined with great mechanical strength values, and, at the same time, a comparatively simple production SOP for the fiber-reinforced metal support, preferably steel sheet, can be indicated.

Of course, the metal support can consist of sheet metal having iron, aluminum, or magnesium materials, or the like, or alloys thereof. In general, it should be mentioned that the fiber-reinforced plastic (FRP) can have a thermoplastic or duroplastic plastic matrix in combination with inorganic or organic reinforcement fibers, such as, for example, glass, basalt, carbon or aramid, as endless, long or short fibers, or can consist thereof. The adhesion can be improved if a chemically cross-linking intermediate layer is used, which can serve as a matrix for the fiber-reinforced plastic. Furthermore, it should be mentioned, in general, that block-resistant is understood to mean that the surface of the coating is no longer sticky. This can also be the case if the surface of the coating is pressed onto another surface, under pressure, for example by a forming tool. In other words: The hardenable coating is at least partially hardened before forming and is no longer sticky.

The method according to the invention can also particularly distinguish itself if carbon-fiber-reinforced plastic (CFP) is applied to the metal support, particularly with a duroplastic matrix, as the fiber-reinforced plastic (FRP).

A cost-advantageous and nevertheless high-strength semi-finished product or end product can be created if pre-impregnated carbon fibers are applied. In this way, a high-strength semi-finished product or end product that is accordingly optimized in accordance with the requirements can specifically be produced, with a comparatively slight increase in its weight. Other pre-impregnated fibers are possible, for example glass fibers, aramid fibers—but carbon fibers with a duroplastic matrix, applied to a steel sheet, have proven to be particularly advantageous for a structural component of a motor vehicle, particularly a rocker panel or side member, with regard to the strength values that can be achieved at acceptable production costs.

If fiber-reinforced plastic is applied to the metal support with a chemically cross-linked intermediate layer, a fiber-reinforced plastic that has already partially hardened can be brought into a comparatively defined hardening state, and thereby the reproducibility of the method can be increased. Furthermore, the adhesion can be improved in this way, particularly if this intermediate layer can serve as a matrix for the fiber-reinforced plastic.

If the fiber-reinforced plastic (FRP) having long fibers is applied to the metal support, coating of a metal support can be carried out comparatively rapidly. As a result, the production costs can be reduced on the basis of short production times. Such application of the long-fiber coating is possible using extrusion, pultrusion.

As an alternative to the long fibers, coating can also be carried out rapidly if a woven fabric or laid scrim of the fiber-reinforced plastic (FRP) is applied to the metal support in cut-to-size form. Furthermore, a continuous method for the production of cost-advantageous semi-finished products or end products can be made possible with such a matrix, which has recesses corresponding to the coating-free support regions.

The woven fabric or laid scrim can either be applied to the metal support pre-impregnated with the plastic matrix, or can be impregnated with the plastic matrix after application to the metal support. For automation of the production method, in this connection a woven fabric pre-impregnated with the plastic matrix, to be laid onto the metal support, has particularly distinguished itself.

If the coating is applied to the metallically and/or organically precoated metal support, possibly with previous treatment using an adhesion-promoting agent, the risk of failure of the material-fit connection between metal support and coating during forming can be clearly reduced. The reproducibility of the method and its parameters can thereby be increased. Furthermore, resistance to water, chemicals, and climatic influences, and, in addition, also improved corrosion protection can be created with such a pretreatment.

If multiple plies of woven fabric or laid scrim are laid one on top of the other for a particularly multidirectional layer structure of the fiber-reinforced plastic (FRP), the mechanical strength of the semi-finished product or end product can be significantly improved.

To expand the block-resistant region and to prevent possible adhesions to the forming tool, a parting layer can be applied to the coating before forming. For example, paper, for example parchment paper, can distinguish itself for such a parting layer.

If the hardenable coating is pre-gelled without pressure and is pressed onto the metal support in a further step, in order to apply it to the metal support, the exit of plastic from the fiber reinforcement can be reduced, and thereby it can be prevented that this plastic advances, in uncontrolled manner, into bending regions of the metal support. By means of the higher viscosity achieved during the course of pre-gelling, exit of plastic can specifically be reduced in comparatively strong manner. Therefore damage to the fiber-reinforced plastic during the course of forming of the metal support does not have to be expected. Furthermore, a coating pre-gelled in this manner, without pressure, can demonstrate no reduced adhesion property, and this can make a mechanically resistant semi-finished product or component possible.

It is particularly advantageous that the method according to the invention can also be used for the production of a bearing structural component, whereby this was able to particularly distinguish itself also for a rocker panel or side member of a motor vehicle.

BRIEF DESCRIPTION OF THE DRAWINGS

The method according to the invention is shown in the figures, as an example. These show.

WAY TO IMPLEMENT THE INVENTION

Figure 1:
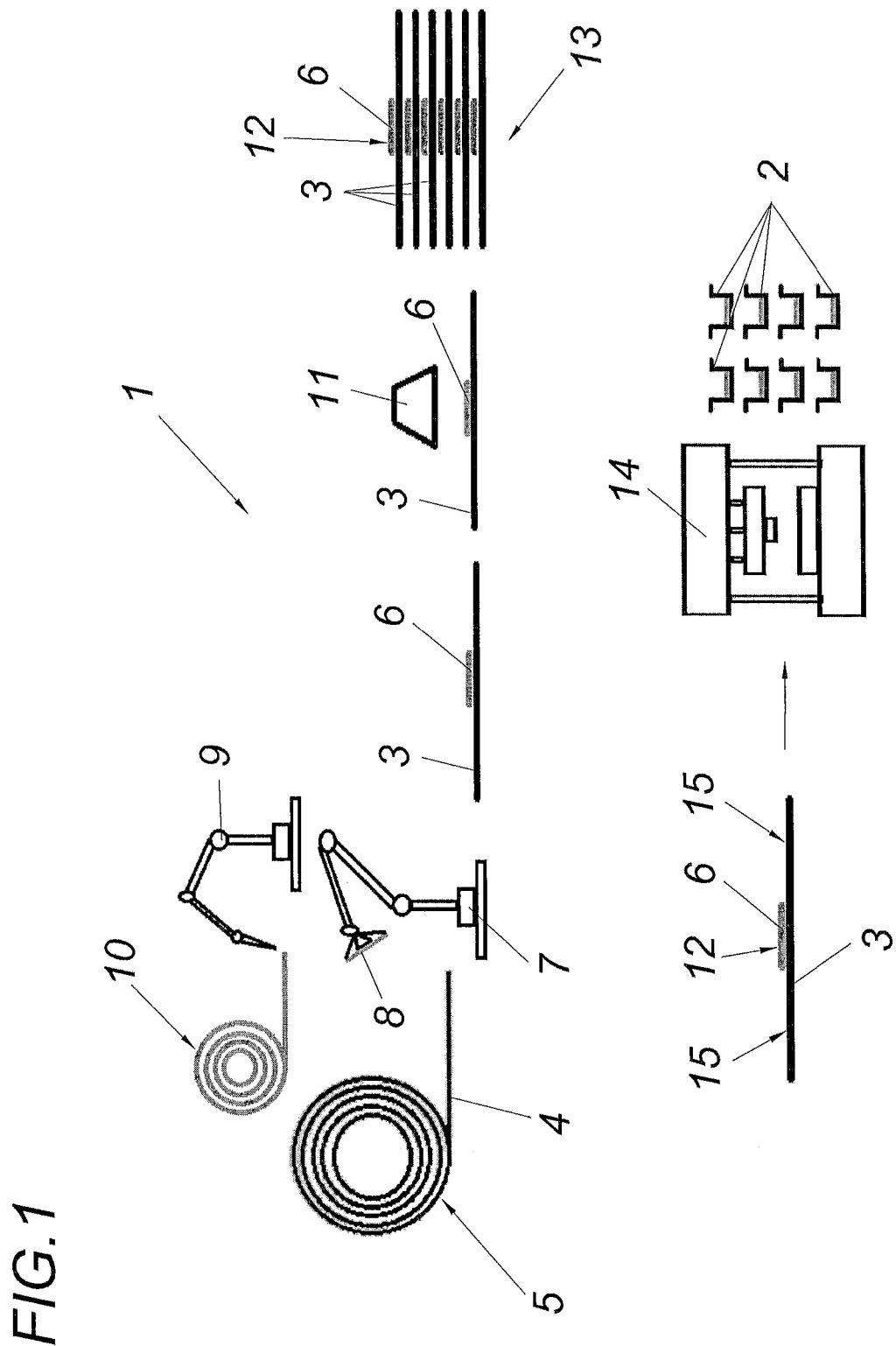
FIG. 1 a method sequence with a fiber-reinforced plastic (FRP) laid onto a metal support, FIG. 2 a method sequence with a metal support, having applied fiber-reinforced plastic (FRP), and FIG. 3 a partial sectional view of a component shown according to FIGS. 1 and 2.

According to the method sequence 1 for the production of a component 2 shown in FIG. 1, a hardenable coating 6 with fiber-reinforced plastic (FRP), is applied to a metal support 3, which is cut off from a coil 4 of steel sheet 5, in a first step. The metal support 3 is possibly still cleaned or chemically pretreated beforehand, on this side to be coated, but this has not been shown in any detail. A robot 7 is provided for application of the coating 6, which robot picks up a cut-to-size piece 8 from the robot 9. For this purpose, the robot 9 cuts a woven fabric 10 pre-impregnated with the plastic matrix to size, in accordance with the surfaces of the regions of the metal support 3 that are to be coated. The coated metal support 3 is subsequently subjected to partial hardening, using a drying or hardening apparatus 11, after which the coating 6 forms at least one block-resistant surface 12. As a result, the metal support 3 can be easily laid also onto a stack 13, and thereby be stored temporarily or prepared for further transport, for example. Particularly, however, it can be made possible, in this way, to enable the coated metal support 3 to be formed into a component 2, in a further step, because its coating 6 has hardened to form at least one block-resistant surface 12. Therefore, the coated metal support 3 is introduced into a deep-drawing tool 14 and formed. Because the metal support 3 is coated on one of its metal support sides at most in certain regions, as can be seen in FIG. 1, comparatively great plastic formability of the metal support 3 can also be ensured. Therefore even great degrees of forming can be fulfilled without failure, as can be required, for example, in the case of a rocker panel or side member of a motor vehicle.

As can also be seen in FIG. 1, a coating-free region 15 is provided everywhere where the metal support 3 is subject to plastic forming by means of deep-drawing. However, further coating-free regions can be present on the metal support 3, in accordance with the requirements.

Figure 2:
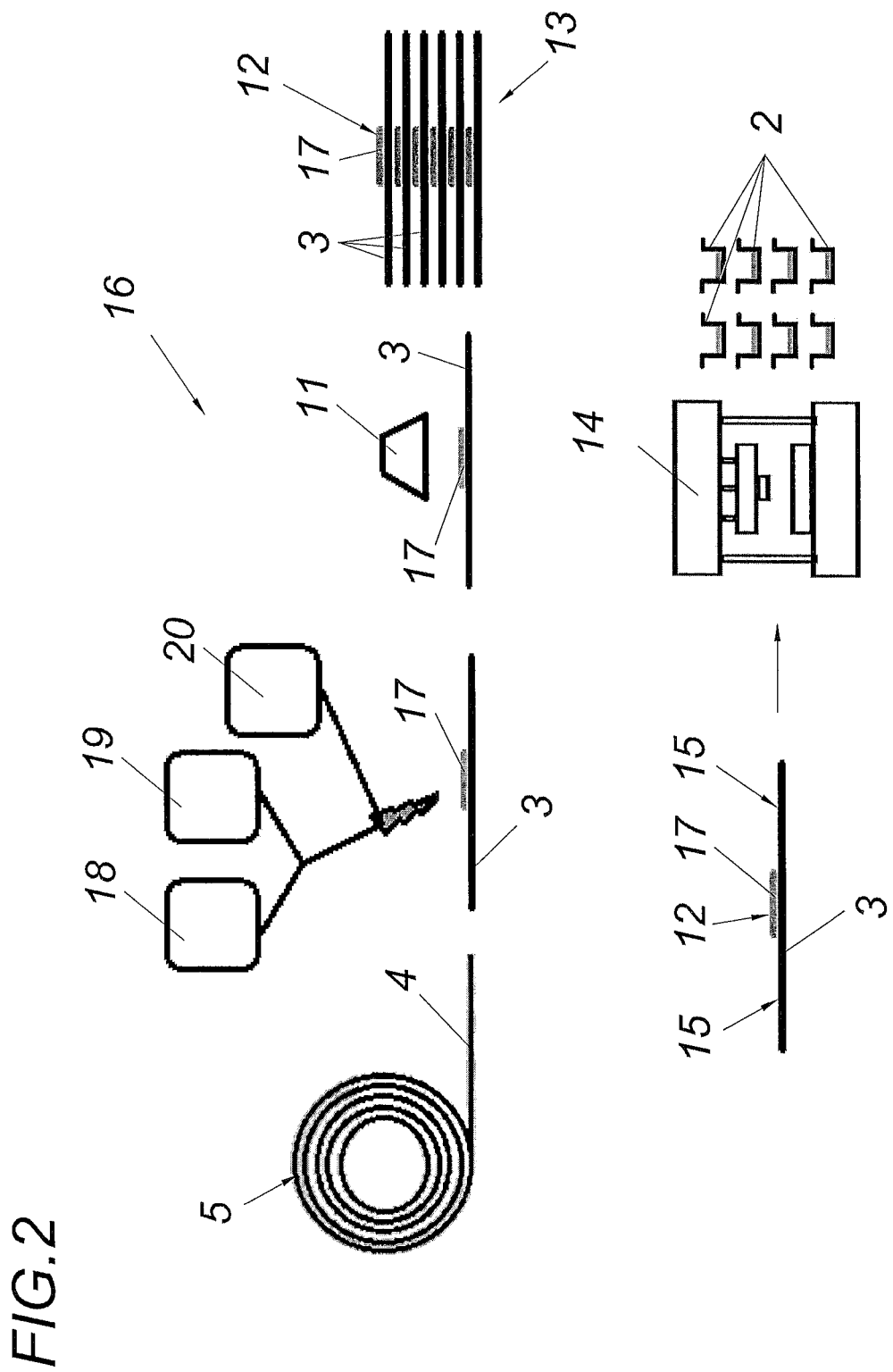

In contrast to the method 1 shown according to FIG. 1, the method 16 according to FIG. 2 has a different manner of application of a coating 17 to the metal support 3. Resin 18 and hardener 19 are mixed with fibers 20, preferably long fibers, in a predetermined ratio, and applied to the metal support 3. Subsequently, as in FIG. 1, block-resistant hardening of the coating 17 takes place, using a drying or hardening apparatus 11. The coated metal supports 3 can then be laid onto a stack 13 again, or also can be immediately subjected to deep-drawing, using the deep-drawing tool 14, which is not shown in any detail.

Figure 3:
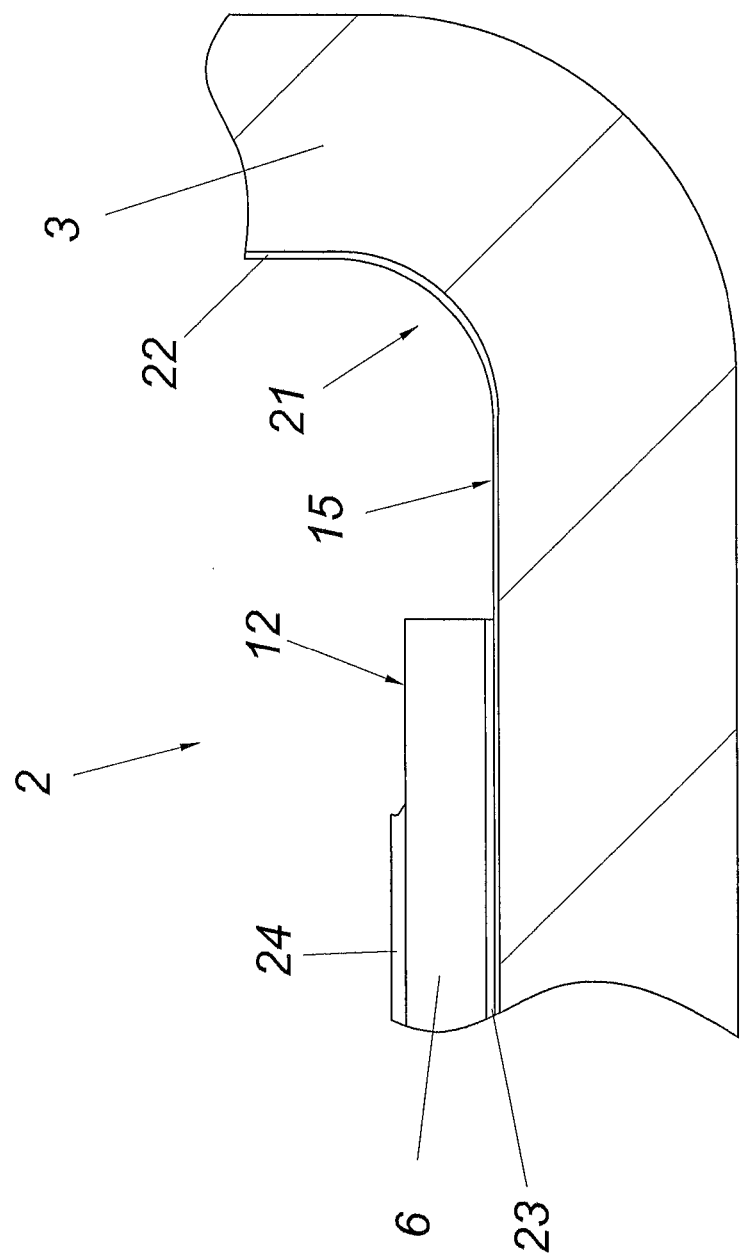

According to FIG. 3, it can be seen that the metal support 3 has coating-free regions 15 that absorb the plastic changes in shape of the metal support 3 during forming, which changes follow the forming radii 21, particularly bending radii. In this way, comparatively great plastic formability of the coated metal support 3 is guaranteed. The metal support furthermore has a metallic and/or organic protective coating 22, for example a zinc layer. Furthermore, an adhesion-promoting agent 23 is provided between the coating 6 and the protective coating 22. A parting layer 24 is also applied to the coating 6 or 7. It is advantageous that the method according to the invention can be used for optimization of the mechanical properties with regard to crash behavior, with regard to compression or bending behavior.

In Table 1, the mechanical properties of non-coated and coated cap profiles were compared as examples.

TABLE 1

| | Steel sheet | Steel sheet with pre-impregnated laid scrim | Steel sheet with subsequently impregnated laid scrim |
|---|---|---|---|
| Fiber volume proportion in the polymer matrix | — | 40 to 70% | 35 to 85% |
| Sheet thickness | 1 mm | 1 mm | 1 mm |
| Coating thickness | — | 1 mm | 0.4 to 0.6 mm |
| Specific absorbed energy during quasi-static axial compression | 100% | >125% | >120% |
| Maximal force during three-point bending | 100% | >135% | >120% |
| Absorbed energy during three-point bending | 100% | >110% | >120% |

For the different stresses, the following test setups were chosen:
For quasi-static axial compression: approx. 50% of the surface with FRP reinforcement;
For three-point bending: approx. 15% of the surface with FRP reinforcement;

The quasi-static axial compression was carried out at a deformation speed of 30 mm/min, up to a deformation of 60%. The three-point bending test was carried out at a deformation speed of 30 ram/min, with a maximal displacement path of 250 mm.

Despite partial coating of the cap profiles, significant improvements in the ability to withstand stress, as compared with a non-coated cap profile, are found, without a restriction of the degrees of forming that can be achieved having to be accepted as a result.

In Table 2, the strength of a planar semi-finished product with different FRP coatings is compared with conventional steel sheets. The FRP coating has at least one block-resistant surface before the tensile test or bending test.

TABLE 2

| | Steel sheet | Steel sheet with pre-impregnated laid scrim | Steel sheet with subsequently impregnated laid scrim | Steel sheet with long fibers in the polymer matrix |
|---|---|---|---|---|
| Fiber volume proportion in the polymer matrix | — | 40 to 70% | 35 to 85% | 15 to 50% |
| Sheet thickness | 1 mm | 1 mm | 1 mm | 1 mm |
| Coating thickness | — | 1 mm | 0.4 to 0.6 mm | 0.5 to 2 mm |
| Strength during the tensile test | 100% | >195% (one ply) | >210% (one ply) >270% (two plies) | >145% |
| Absorbed energy during three-point bending | 100% | >231% | >157% (one ply) >209% (two plies) | >176% |
| Specific absorbed energy during three-point bending | 100% | >191% | >151% (one ply) >180% (two plies) | >158% |

Hardening of the FRP coating took place between 20 and 130° C. for 120 to 500 minutes. Preferably, in the case of pre-impregnated laid scrim, between 90 and 130° C. for 90 to 180 minutes, and, in the case of subsequently impregnated laid scrim and when using long fibers, between 20° C. and 60° C. for at least 480 minutes.

The ratio of metal support thickness to coating thickness has proven to be advantageous in a range of 1:2 to 1:0.4, in the examples. The steel sheet thickness or sheet thickness of the metal support material, in each instance, can also be varied; the invention can distinguish itself, in particular, at a metal support thickness in the range of 0.6 to 5 mm, particularly 1 to 2.5 mm.

In total, it has thereby been shown that it was possible to increase the strength by 10 to 20%, surprisingly already with relatively thin FRP layers in the range of 0.2 to 3 mm, particularly 0.4 to 2 mm coating thickness. A total weight saving, for example of a rocker panel or side member, in the range of above 10% can certainly be achieved in this way. This advantageously results in a lower vehicle body weight and thereby lower total vehicle weight, which is also reflected in lower fuel consumption.

The invention claimed is:
1. Method for the production of a semi-finished product or component, the method comprising steps of:
applying a hardenable coating with fiber-reinforced plastic to a metal support, the hardenable coating being applied to certain regions of the metal support and other regions of the metal support being left free as coating-free regions, hardening the hardenable coating on the metal support such that the hardenable coating forms a block-resistant surface, and forming the coated metal support with the block-resistant surface such that the metal support undergoes plastic deformation along forming radii, the forming radii being exclusively in the coating-free regions of the metal support.

2. Method according to claim 1, wherein carbon-fiber-reinforced plastic is applied to the metal support with a duroplastic matrix as the fiber-reinforced plastic.

3. Method according to claim 2, wherein pre-impregnated carbon fibers are applied.

4. Method according to claim 1, wherein fiber-reinforced plastic is applied to the metal support with a chemically cross-linked intermediate layer.

5. Method according to claim 1, wherein the fiber-reinforced plastic has long fibers.

6. Method according to claim 1, wherein a woven fabric or laid scrim of the fiber-reinforced plastic is applied to the metal support in cut-to-size form.

7. Method according to claim 6, wherein the woven fabric or the laid scrim is either applied to the metal support pre-impregnated with the plastic matrix, or impregnated with the plastic matrix after application to the metal support.

8. Method according to claim 1, further comprising a step of metallically and/or organically pre-coating the metal support before applying the hardenable coating.

9. Method according to claim 8, wherein an adhesion-promoting agent is used to metallically and/or organically pre-coat the metal support.

10. Method according to claim 1, wherein multiple plies of woven fabric or laid scrim are laid one on top of the other for a multidirectional layer structure of the fiber-reinforced plastic.

11. Method according to claim 1, wherein a parting layer is applied to the coating before forming.

12. Method according to claim 1, wherein the metal support is a sheet having a sheet thickness of 0.6 to 5 mm.

13. Method according to claim 1, wherein the hardenable coating has a thickness of 0.2 to 3 mm.

14. Method according to claim 1, wherein the hardenable coating is pre-gelled without pressure and is pressed onto the metal support in a further step, in order to apply it to the metal support.

15. Method according to claim 1, further comprising a step of:
producing a supporting structural component from the formed coated metal support.

16. Method according to claim 15, wherein the supporting structural component is selected from the group consisting of a rocker panel of a motor vehicle and a side member of a motor vehicle.

17. Method according to claim 1, wherein the metal support is sheet metal.

18. Method according to claim 1, wherein the forming step comprises deep-drawing or bending of the coated metal support with the block-resistant surface.

19. Method according to claim 1, wherein the metal support is a sheet having a sheet thickness of 1 to 2.5 mm.

20. Method according to claim 1, wherein the hardenable coating has a thickness of 0.4 to 2 mm.

* * * * *